United States Patent [19]

Wize

[11] 4,283,075
[45] Aug. 11, 1981

[54] PASSIVE OCCUPANT SHOULDER BELT

[75] Inventor: Gary A. Wize, Washington, Mich.

[73] Assignee: General Motors Corporation, Detroit, Mich.

[21] Appl. No.: 117,618

[22] Filed: Feb. 1, 1980

[51] Int. Cl.³ ............................................. B60R 21/10
[52] U.S. Cl. ................................................... 280/804
[58] Field of Search ................. 280/804, 803; 180/270

[56] References Cited

U.S. PATENT DOCUMENTS

| | | | |
|---|---|---|---|
| 3,506,083 | 4/1970 | Botnick | 180/270 |
| 3,680,883 | 8/1972 | Keppel et al. | 280/804 |
| 3,831,974 | 8/1974 | Keppel | 280/804 |
| 4,004,829 | 1/1977 | Kato et al. | 280/802 |
| 4,159,834 | 7/1979 | Miller et al. | 280/802 |

*Primary Examiner*—Robert R. Song

*Attorney, Agent, or Firm*—C. E. Leahy

[57] ABSTRACT

A diagonal shoulder belt has an upper end attached to the vehicle body roof inboard the seat and a lower end mounted on the lower rear corner of the door by a retractor. A stiffening sleeve surrounds the uppermost portion of the shoulder belt and is pivoted to the vehicle roof. A track extends longitudinally along the roof forwardly from the point of attachment of the shoulder belt. A belt carriage is movable along the track and engages the stiffening sleeve during the initial forward movement of the carriage to abruptly pivot the stiffening sleeve from the vertically depending position to a horizontally raised position, thereby abruptly raising the shoulder belt forwardly of the occupant to a stowed position along the roof. Continued forward movement of the carriage beyond the stiffening sleeve progressively stows the shoulder belt along the roof.

3 Claims, 5 Drawing Figures

PASSIVE OCCUPANT SHOULDER BELT

The invention relates to a passive occupant restraint belt and, more particularly, provides a shoulder belt having an upper end mounted on a vehicle body by a belt stiffening means which is abruptly pivoted forwardly by a track mounted carriage to raise the shoulder belt away from the occupant.

BACKGROUND OF THE INVENTION

It is known to provide a passive occupant shoulder belt in which the belt upper end is mounted on the vehicle roof inboard the seat and the belt lower end is mounted on the vehicle door by a retractor at the lower rear corner of the door so that door movement automatically moves the belt between an occupant restraining position and an access position forward of the occupant.

U.S. Pat. No. 3,680,883 by Keppel et al, granted Aug. 1, 1972, discloses a shoulder belt arrangement in which the shoulder belt upper end is mounted on the vehicle body roof rail by a carriage which is displaced forwardly along a roof rail mounted track during door opening movement to progressively stow the shoulder belt along the roof rail and thereby move the shoulder belt forwardly of the occupant to permit occupant ingress and egress.

The present invention provides a new and improved restraint system wherein a belt stiffener is associated with an uppermost portion of the shoulder belt so that the initial forward movement of a belt-engaging carriage abruptly pivots the stiffened belt portion forwardly from the downwardly depending occupant restraining position to a stowed position along the roof.

SUMMARY OF THE INVENTION

More particularly, the invention provides a diagonal shoulder belt having an upper end attached to the vehicle body roof inboard the seat and a lower end mounted on the lower rear corner of the door by a retractor. A stiffening sleeve surrounds the uppermost portion of the shoulder belt and is pivoted to the vehicle roof. A track extends longitudinally along the roof forwardly from the point of attachment of the shoulder belt. A belt carriage is movable along the track and engages the stiffening sleeve during the initial forward movement of the carriage to abruptly pivot the stiffening sleeve from the vertically depending position to a horizontally raised position, thereby abruptly raising the shoulder belt forwardly of the occupant to a stowed position along the roof. Continued forward movement of the carriage beyond the stiffening sleeve progressively stows the shoulder belt along the roof.

The object, feature and advantage of the invention resides in the provision of a stiffening sleeve about a shoulder belt end fixed to the vehicle roof and adapted for engagement by a track-mounted belt carriage upon initial forward movement of the carriage to abruptly pivot the stiffened shoulder belt portion upwardly and away from the seated occupant.

DESCRIPTION OF THE DRAWINGS

These and other objects, features and advantages of the invention will become apparent upon consideration of the specification and the appended drawings, in which.

DESCRIPTION OF THE PREFERRED EMBODIMENT

Figure 1:
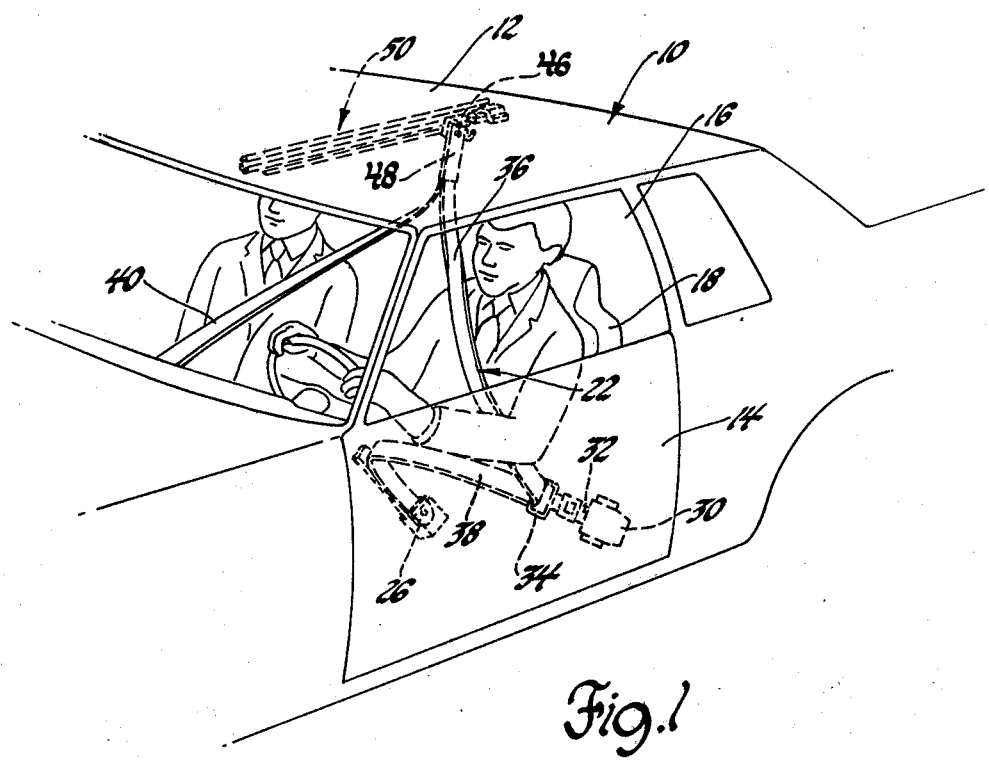
FIG. 1 is a perspective view of a vehicle body having a restraint system according to the invention shown in the occupant restraining position.

Referring now to the drawings, a vehicle body, generally indicated as 10, includes a roof 12 and a door 14 which cooperate to define a passenger compartment 16 in which a driver seat 18 is situated.

A restraint belt system associated with the driver seat 18 includes a continuous-loop belt 22 having an upper end connected to the roof 12 inboard the seat and a lower end attached to the vehicle body inboard the seat 18 by a mounting bracket 26. A retractor 30 mounted on the lower rear corner of the door 14 winds a control belt 32 having a junction ring 34 attached thereto. The junction ring 34 encircles the continuous-loop belt 22 to divide the continuous-loop belt 22 into a shoulder belt 36 and a lap belt 38.

When the door is closed, as shown in FIG. 1, the control belt 32 is fully wound upon the doormounted retractor 30 so that the shoulder belt 36 is diagonally disposed across the driver's upper torso and the lap belt 38 is disposed across the driver's lap.

A similar restraint belt arrangement is associated with the passenger seat adjacent the driver seat and includes a shoulder belt 40.

Figure 3:
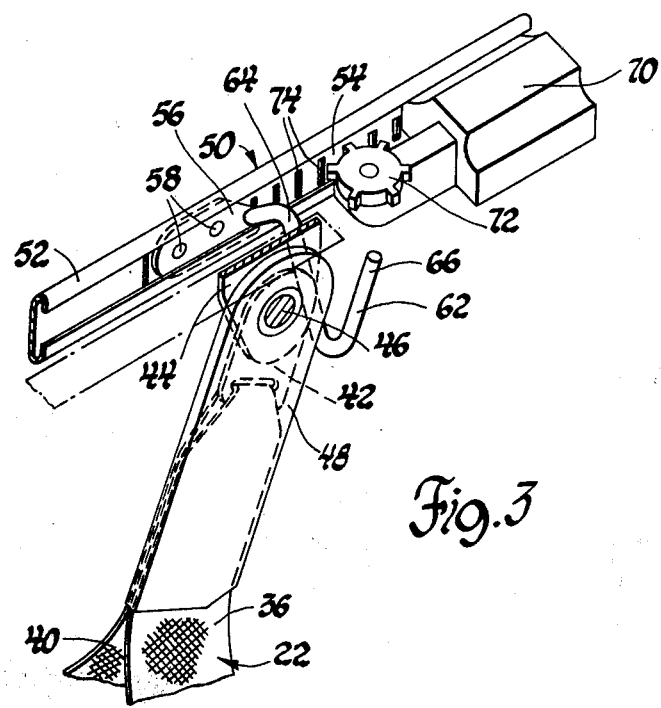
FIG. 3 is an enlarged fragmentary perspective view similar to FIG. 1 showing the attachment of the shoulder belt upper end to the vehicle roof by a belt-stiffening sleeve and a belt carriage and track assembly adapted to stow the shoulder belt along the vehicle roof.
Figure 4:
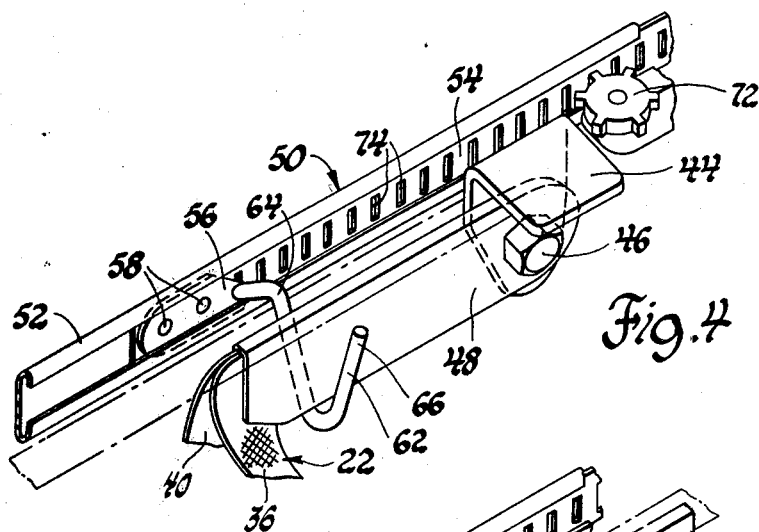
FIG. 4 is a view similar to FIG. 3, but showing the initial forward movement of the belt carriage to abruptly pivot the stiffened belt portion upwardly against the vehicle roof.
Figure 5:
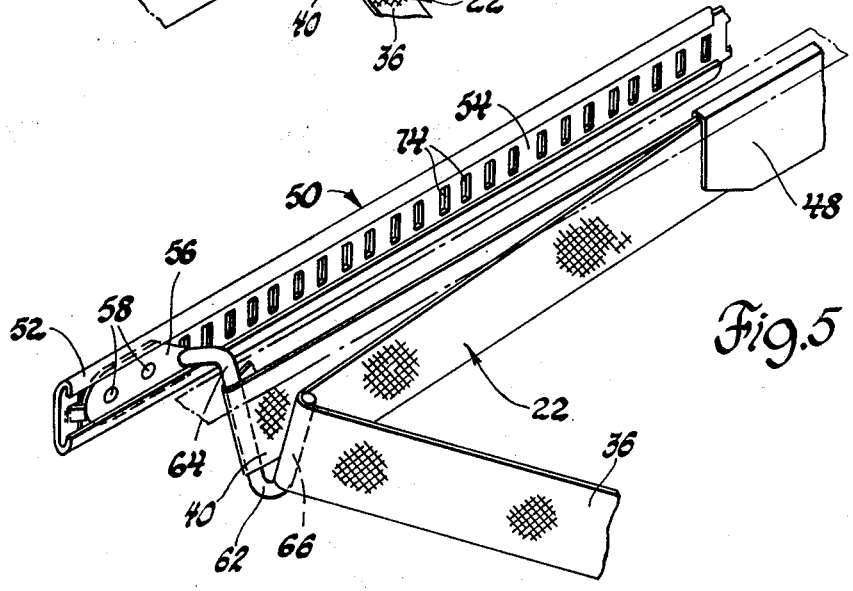
FIG. 5 is a view similar to FIGS. 3 and 4, but showing further forward movement of the belt carriage from the position of FIG. 4 to stow the shoulder belt along the vehicle roof.

Referring to FIGS. 3 and 4, it is seen that the upper end of the continuous-loop belt 22 is attached to the vehicle roof 12 by a mounting link 42 which is attached to a roof bracket 44 by a pivot bolt 46. The belt 40 for the passenger is also attached to the mounting link 42. A stiffening sleeve 48 of plastic or metal construction encases the upper portion of the shoulder belts 36 and 40 and is pivotally connected to the vehicle roof by the pivot bolt 46.

A carriage and track arrangement generally designated 50 is provided to stow the shoulder belts 36 and 40 along the vehicle roof when the door 14 is opened. Referring to FIG. 3, it is seen that the track 52 is preferably constructed of steel roll-formed to a C-shape to confine a perforated plastic drive tape 54. A belt carriage 56 is attached to the drive tape 54 by rivets 58 and has a V-shaped belt-engaging hook 62 defined by a pair of legs 64 and 66 diverging from one another. A drive motor 70 rotates a drive gear 72 which meshes with perforations 74 of the drive tape 54 to effect longitudinal fore and aft movement of the drive tape 54 and the belt carriage 56.

FIG. 3 shows the belt carriage 56 situated at its normal position rearwardly of the roof bracket 44 so that the shoulder belts 36 and 40 and the stiffening sleeve 48 are permitted to hang in the normal vertically depending position in which the shoulder belts are disposed in diagonal restraining position across the upper torso as shown in FIG. 1.

Upon opening of the door, or some other suitable indicia of occupant exit from the vehicle, the motor 70 is energized and the drive gear 72 displaces the drive tape 54 in the forward direction. As seen in FIG. 4, the initial forward movement of the carriage 56 from the position of FIG. 3 causes the V-shaped hook 62 to engage the stiffening sleeve 48 and abruptly pivot the stiffening sleeve from the vertically depending position to the horizontal position of FIG. 4 lying generally parallel with the vehicle roof 12. Accordingly, the shoulder belts 36 and 40 are abruptly moved upwardly and forwardly away from the occupant by an extent determined by the length of the stiffening sleeve 48.

Still further movement of the belt carriage 56 from the position of FIG. 4 causes the belt 22 to be engaged directly by the leg 66 of hook 62 to progressively stow the shoulder belt 36 along the vehicle roof 12. The shoulder belt 40 of the restraint system associated with the passenger seat is simultaneously stowed along the vehicle roof.

Figure 2:
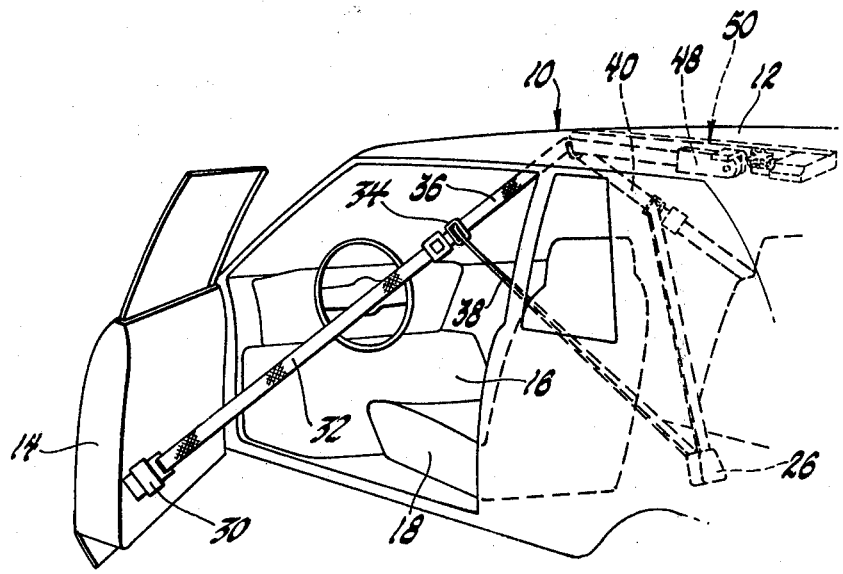
FIG. 2 is a perspective view of the restraint system of FIG. 1 showing the vehicle door opened and the restraint system moved to the occupant access position.

Referring to FIG. 2, it is seen that the progressive stowage of the shoulder belt 36 along the vehicle roof 12 by forward movement of the belt carriage 56 foreshortens the depending length of the shoulder belt 36 and in so doing raises the junction ring 34 substantially forward and upwardly away from the seated occupant. The control belt 32 is unwound from the door-mounted retractor 30 to permit the upward and forward movement of the junction ring 34 and the outward swinging movement of the door 14.

When the occupant enters the vehicle and closes the door 14, the control belt 32 is rewound upon the retractor 30. Furthermore, the motor 72 is energized in the reverse direction to drive the drive tape 54 and belt carriage 56 rearwardly to progressively lower the shoulder belt 36 as well as the lap belt 38 about the occupant. During the final stage of rearward movement to the position of FIG. 3, the stiffening sleeve 48 is abruptly lowered from the horizontal to the vertical position to drop the shoulder belt 36 as well as the lap belt 38 to the normal occupant-restraining position.

Thus it is seen that the invention provides a new and improved occupant-restrainint system wherein a shoulder belt upper end is encased within a stiffening sleeve which is abruptly pivoted between a vertically depending position and a horizontally raised position upon the initial forward movement of a belt-engaging carriage along a roof-mounted track.

While this invention has been disclosed primarily in terms of the specific embodiment shown in the drawings, it is not intended to be limited thereto but rather only to the extent set forth in the appended claims. For example, while the drawings show the invention embodied in a passive lap-and-shoulder belt comprised of a continuous-loop lap and shoulder belt and a control belt, it is possible to use the invention in conjunction with other seat belt configurations in which a shoulder belt upper end is fastened to the vehicle roof and moved to a stowed condition along the vehicle roof by a carriage-and-track assembly.

The embodiments of the invention in which an exclusive property or privilege is claimed are defined as follows:

1. In combination with a vehicle body having a roof and an occupant seat, a passive restraint system comprising:
  a shoulder belt having an upper end and a lower end;
  mounting means fixedly attaching the upper shoulder belt end on the vehicle roof generally rearward and at one side of the seat;
  retractor means retractably mounting the lower shoulder belt end at a low location at the opposite side of the seat to dispose the shoulder belt diagonal restraining position across the occupant;
  a track extending longitudinally along the roof forwardly from the mounting means;
  a belt carriage movable along the track and having a belt engaging means thereon adapted to progressively stow the shoulder belt along the roof during forward movement of the belt carriage along the track; and
  belt stiffening means associated with a portion of the upper belt end adjacent the mounting means and adapted to be engaged by the belt engaging means and abruptly pivoted forward to thereby raise the stiffened shoulder portion from the diagonal restraining position to the stowed position along the roof immediately upon initiation of forward movement of the carriage.

2. In combination with a vehicle body having a roof and an occupant seat, a passive restraint system comprising:
  a shoulder belt having an upper end mounted on the roof at one side of the seat and a lower end mounted on the body at the other side of the seat;
  a stiffening means associated with the upper end portion of the shoulder belt;
  pivot means acting between the stiffening means and the vehicle roof to mount the stiffening means for pivotal movement between a normal depending position disposing the shoulder belt in restraining position across the occupant and a horizontally raised position;
  a track extending longitudinally along the roof forwardly from the pivot means;
  a belt carriage movable along the track and having a belt engaging means thereon adapted to engage the stiffening means during the initial forward movement of the carriage from a normal position rearward the pivot means to abruptly pivot the stiffening means from the depending position to the horizontally raised position and thereby abruptly raise the shoulder belt forwardly of the occupant.

3. In combination with a vehicle body having a roof, a door, a floor, and an occupant seat, a passive occupant restraint system comprising:
  a continuous-loop belt having an upper end attached to the vehicle roof inboard the occupant seat and a lower end attached to the vehicle floor inboard the occupant seat;
  a retractor mounted on the vehicle door;
  a control belt mounted by the door-mounted retractor and connected to the continuous-loop belt to divide the loop belt into a lap belt portion disposed in restraining position across the occupant lap and a shoulder belt portion disposed in diagonal restraining position across the upper torso;

a track extending longitudinally along the roof forwardly from the upper end of the continuous-loop belt;

a belt carriage movable along the track and having a belt-engaging means thereon adapted to progressively engage and stow the shoulder belt along the roof during forward movement of the belt carriage along the track; and belt stiffening means associated with the uppermost portion of the upper belt end and adapted to abruptly pivot forward and thereby raise the stiffened shoulder belt portion from the diagonal restraining position to the stowed position along the roof immediately upon initiation of forward movement of the belt carriage along the track.

* * * * *